Nov. 18, 1924.

O. SCHLAUPITZ

GAUGING AND ASSORTING MACHINE

Filed July 2, 1923 5 Sheets-Sheet 1

Inventor:
Oswald Schlaupitz
by his Attorneys.

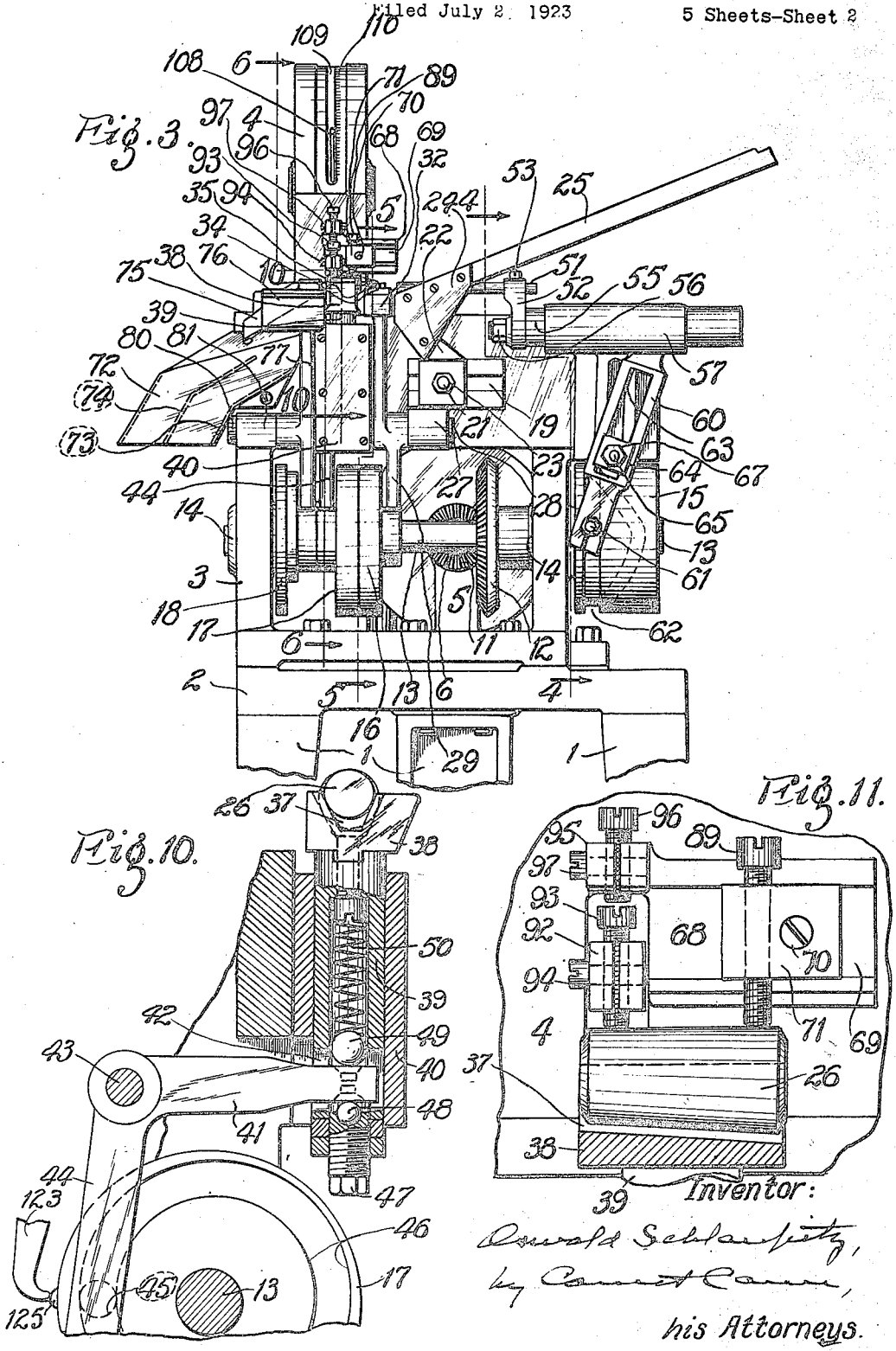

Nov. 18, 1924.
O. SCHLAUPITZ
GAUGING AND ASSORTING MACHINE
Filed July 2 1923
1,516,123
5 Sheets-Sheet 3
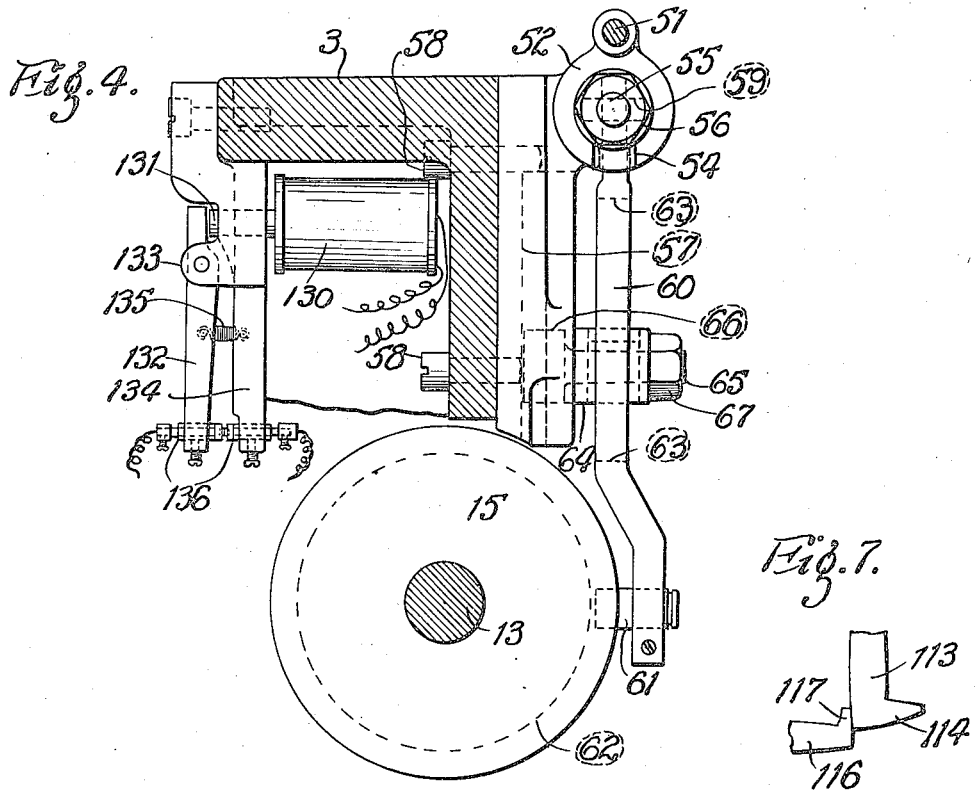
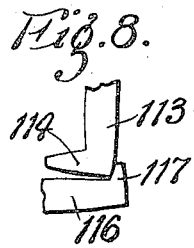
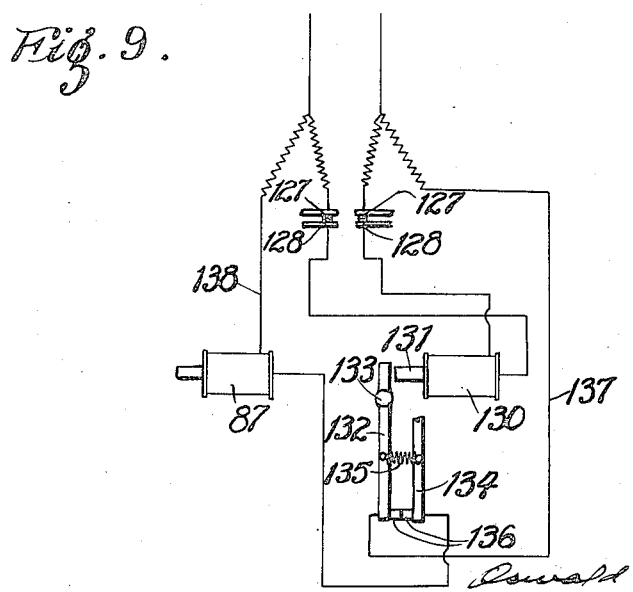
Inventor:
Oswald Schlaupitz,
by Cann & Cann,
his Attorneys

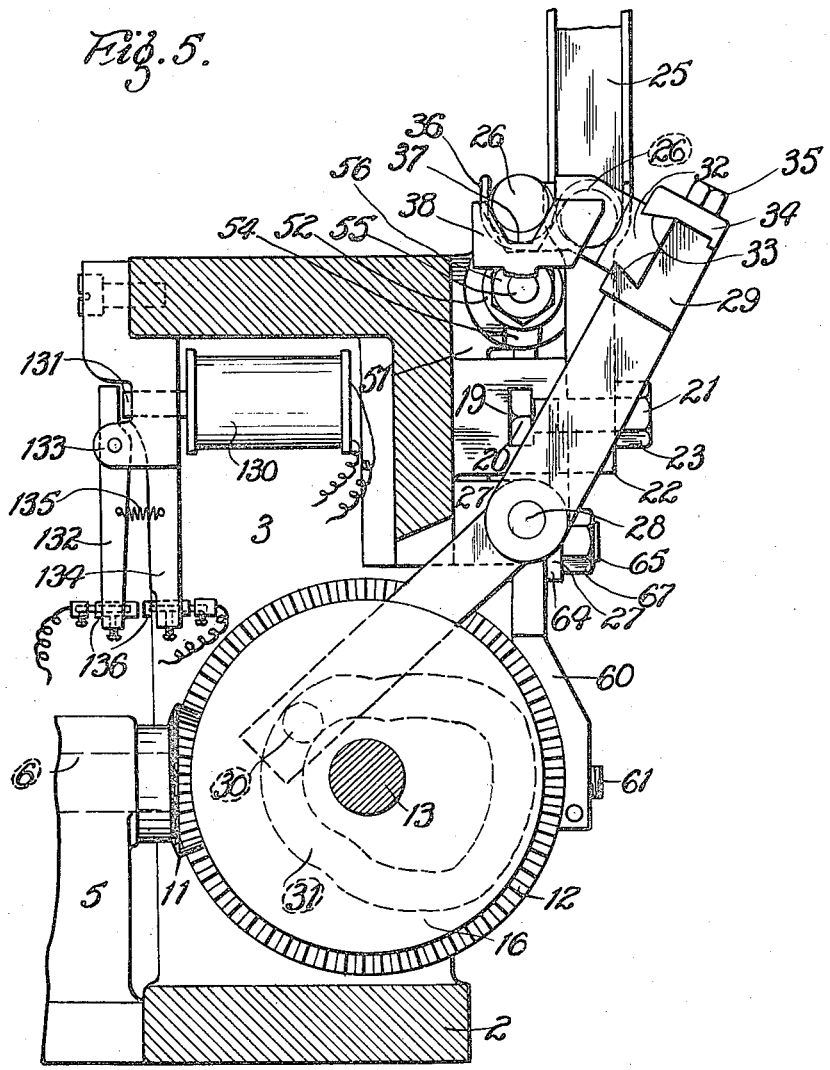

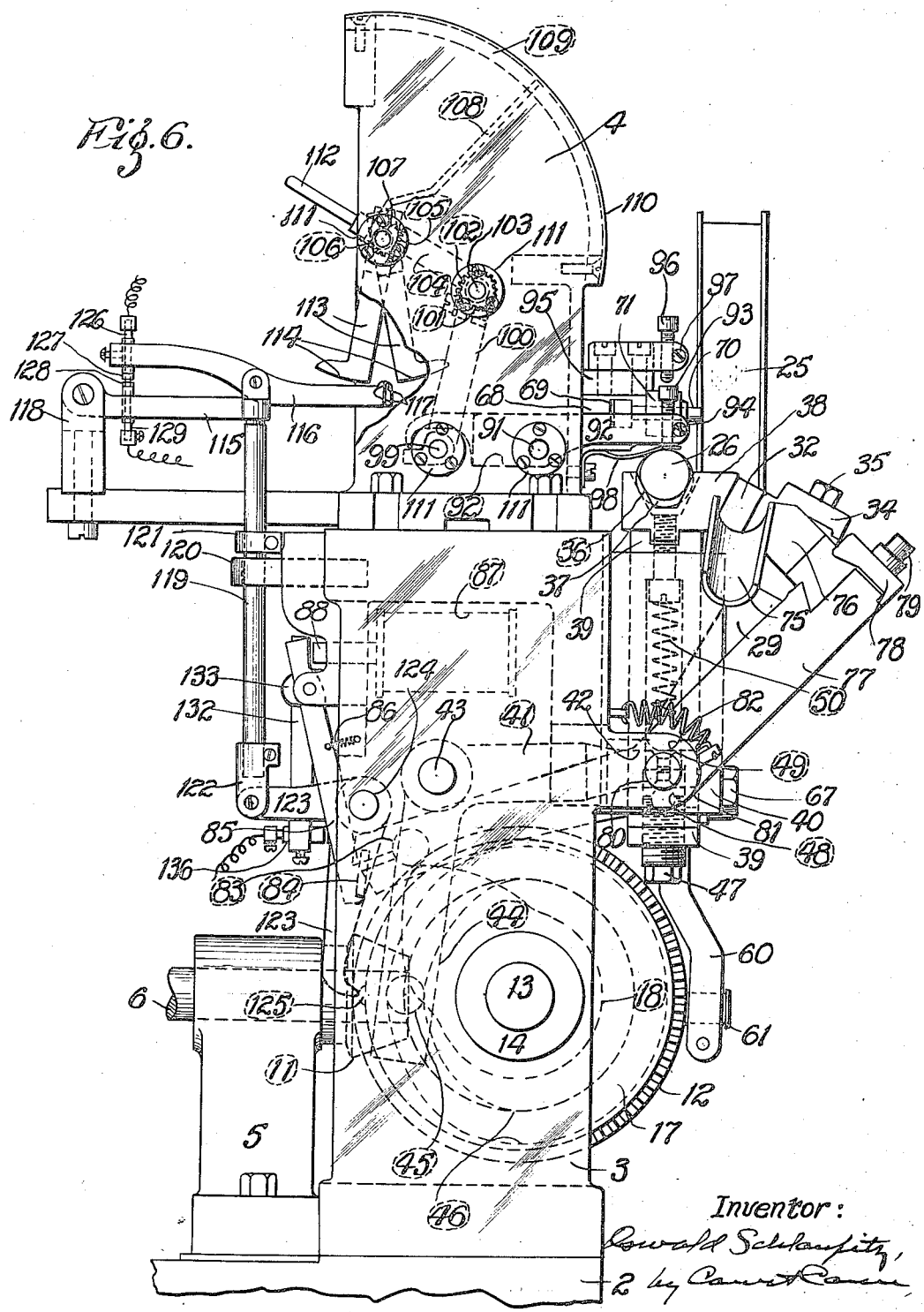

Patented Nov. 18, 1924.

1,516,123

UNITED STATES PATENT OFFICE.

OSWALD SCHLAUPITZ, OF CANTON, OHIO, ASSIGNOR TO THE TIMKEN ROLLER BEARING COMPANY, OF CANTON, OHIO, A CORPORATION OF OHIO.

GAUGING AND ASSORTING MACHINE.

Application filed July 2, 1923. Serial No. 649,092.

*To all whom it may concern:*

Be it known that I, OSWALD SCHLAUPITZ, a citizen of the United States, and a resident of the city of Canton, county of Stark, and State of Ohio, have invented a certain new and useful Improvement in Gauging and Assorting Machines, of which the following is a specification.

My invention relates to gauging and assorting machines and particularly to machines for gauging the taper of conical rollers such as are used in roller bearings and assorting them; and it has for its principal objects a machine that will gage such rollers quickly and accurately and that will automatically assort them according to whether they are of proper taper or incorrect taper, that can be adjusted so as to allow greater or less variation from the precise taper desired and that can be used to accommodate rollers of different sizes. The invention consists in the gaging machine and in the parts and combination parts hereinafter described and claimed.

In the accompanying drawings,

Fig. 3 is a front elevation thereof,

Fig. 4 is a sectional view on the line 4—4 of Fig. 3,

Fig. 5 is a sectional view on the line 5—5 of Fig. 3,

Figure 1:
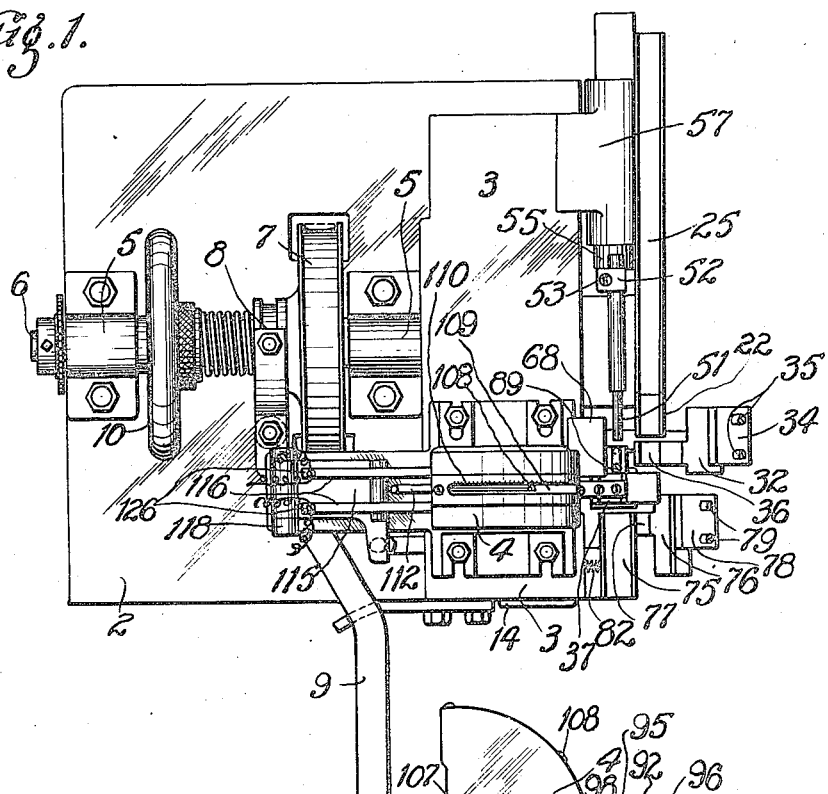
Fig. 1 is a top plan view of a gauging machine embodying my invention.
Figure 2:
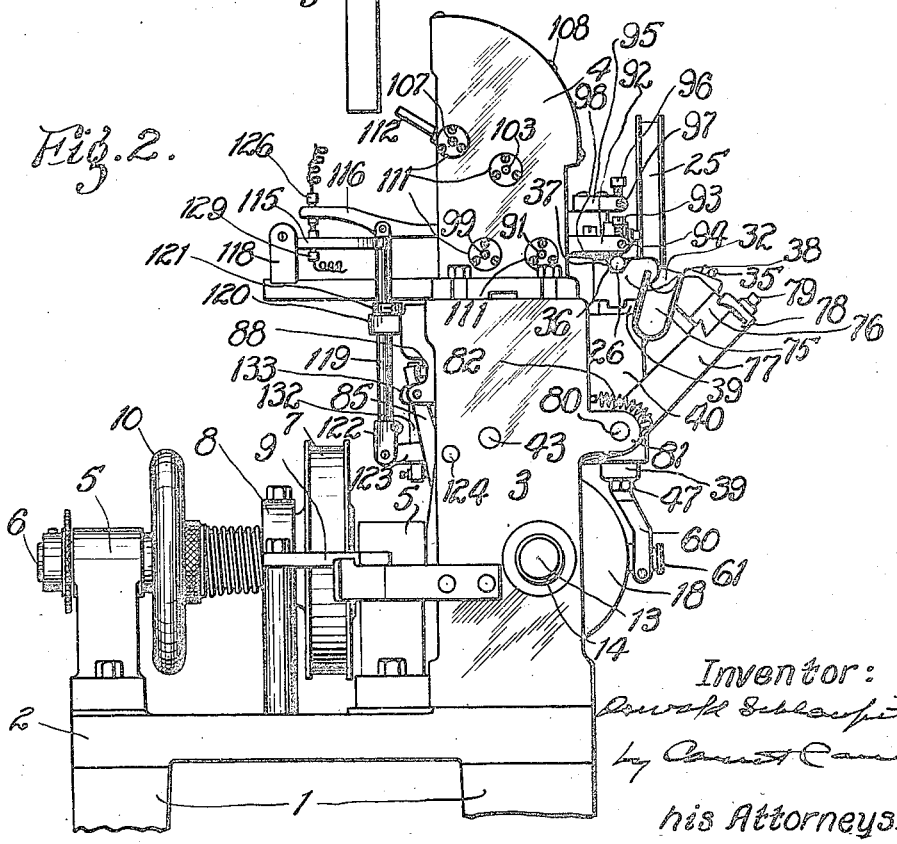
Fig. 2 is a side elevation thereof.

Fig. 6 is an elevation similar to Fig. 2 the mechanism being shown in detail and on a larger scale, Figs. 7 and 8 are detail views of the control lever of the rejector circuit, Fig. 9 is a wiring diagram, Fig. 10 is a sectional view on the line 10—10 of Fig. 3 showing the means for raising a roller into position to be gaged, and Fig. 11 is a detail view on an enlarged scale of a roller being gaged.

Mounted on legs 1 is a table 2 on which is mounted a frame 3 that supports the operating mechanism of the gauging machine. On the top of said frame is a housing 4 in which the gauging and indicating mechanisms are contained. Disposed in suitable bearings 5 on the table 2 is a drive shaft 6 on which is mounted a belt pulley 7 or the like which is provided with a suitable clutch mechanism 8. The clutch mechanism is provided with a hand lever 9 by means of which the clutch may be disengaged and the pulley 7 be permitted to run idle on said shaft 6. The shaft 6 is provided with a hand wheel 10 so that the machine may be run by hand when desired, as, for instance, in making adjustments of the machine.

On the end of said shaft 6 is a pinion 11 that meshes with a gear 12 on a cam shaft 13 that is mounted in suitable bearings 14 in the lower part of the frame. Mounted on said cam shaft 13 are four cams, namely a shifter cam 15, a feed cam 16, an elevating cam 17 and a rejector cam 18, the operation of which will hereinafter be described.

Mounted in a slot 19 on the frame is the head 20 of a bolt 21, on which is carried a support 22. The support may be adjusted horizontally by loosening the nut 23 on the end of the bolt and moving said bolt in its slot. Secured to said support 22 by means of a plate 24 is a chute 25 by which the conical rollers 26 are fed to the machine. Said chute 25 is inclined so that the rollers 26 are fed by gravity into the machine. The chute is preferably connected with some suitable form of automatic feeding machine (not shown in the drawings) that will feed the rollers into the chute with their smaller ends foremost.

Beneath the bolt support 22 is a lug 27 in which is mounted a pivot pin 28 on which is rotatably secured a lever 29. As its lower end the lever 29 is provided with a pin 30 that runs in a cam slot 31 in the feed cam 16. At its upper end the feed lever 29 carries a finger 32. Said feed finger 32 is provided with beveled portions 33 that cooperate with recesses in the feed lever 29 and a cap member 34 to form a dove-tail connection. The cap 34 is secured to the end of the lever by suitable screws 35. By loosening said screws 35, the feed finger 32 may be adjusted or it may be removed from the machine and a different feed finger substituted therefor. The movement of the feed fingers is such that in one end of its movement the pocket 36 thereof is in line with the pocket in the end of the inlet chute support 22. At the other limit of its movement, the pocket of said feed finger 32 is in line with the pocket 37 of the block 38 in which the roller is held while it is being gaged. The gauging (roller receiving) block 38 is mounted on a hollow plunger 39 that is vertically movable in a suitable bearing member 40 secured to the frame. The roller receiving recess 37 in the gauging block 38 is a tapered V-shaped groove that is so constructed that the upper edge of a roller that has the proper taper will be horizontal when said roller lies in the recess.

The plunger 39 is supported on and moved by a lever 41 that projects through an opening 42 in the lower end thereof. The lever 41 is pivotally mounted on a suitable member 43 and the downwardly extending arm 44 thereof is provided with a pin 45 that runs in the cam slot 46 in the elevating cam 17. The lower end of the hollow plunger 39 is closed by an adjusting screw 47, in whose upper surface is a pocket in which rests a ball 48. The end of the lever 41 rests on said ball 48 and on top of the lever is another ball 49. Between the upper ball 49 and the top of the plunger is a spring 50. The spring holds the end of the lever 41 firmly between the two balls. This lost motion device is needed because rollers of different sizes must be gaged. The lever 41 is given an excessive travel, and when the roller in the block 38 contacts with the gauging mechanism to be hereinafter described, the plunger 39 ceases its movement but the lever 41 is permitted to continue its movement against the pressure of the spring 50. The spring 50 is also a safety device that protects the parts from damage and insures that each roller is held by the proper pressure while it is being gaged.

The rollers are fed into the recess in the roller gauging block 38 from the feed finger 32 by means of a pin 51. The feed pin 51 is mounted in a hole in the top of a plate 52 and is secured therein by means of a screw 53. The plate has a vertical slot 54 therein that receives the reduced end portion of a rod 55. The plate 52 is held in position on the rod 55 by means of a nut 56. The nut 56 permits adjustment of the plate 52, and the screw 53 permits adjustment of the feed pin 51. The rod 55 is slidably mounted in the bore of a bracket 57 that is secured to the frame by screws 58. Pivotally secured to the shifter rod 55, as by means of a pin 59, is a lever 60, to whose lower end is secured a pin 61 that runs in the cam slot 62 of the shifter cam 15. The lever has an elongated slot 63 extending longitudinally thereof and in said slot is a block 64 that has a pivot pin 65 extending therethrough. The pin 65 has an enlarged head 66 that fits in an undercut recess in the bracket 57 and has a nut 67 on the threaded end thereof which may be tightened to secure the block 64 in place.

As the lever 60 is moved by the cam 15, it gives a reciprocating movement to the rod 55 which carries with it the feed pin 51. When the feed pin 51 is moved to the left, it strikes the roller 26 in the feed finger 32 and feeds it into the groove in the gauging block 38. The lever 60 is free to slide on the block sufficiently to permit the rod 55 to move in a straight line. The stroke of the rod may be varied by moving the pivot pin 65 and slide block 64 up or down in the slot in the bracket.

Secured to the indicator housing 4 is a lug 68 that is provided with a slot 69 in which is mounted a nut that receives the threaded end of a screw 70 on which is mounted a block 71. The block 71 forms a stop for the roller 26 while it is being gaged. The gauging and indicating mechanism will be described hereinafter.

Secured to the frame adjacent to the gauging block 38 in its lowest position, is an outlet chute 72 for the rollers. The outlet chute is provided with two passageways of which the lower 73 (that is the one closer to the gauging block) is for rollers of the proper taper and the upper 74 (that is the one further away from the gauging block) is for rejected rolls, that is, rolls of incorrect taper. The roller in the gauging block is forced into the outlet chute by the next following roller being fed into the roller receiving block 38 by the feed finger 32.

The machine as shown in Figs. 2 and 6 has just gaged a roller 26 of the proper taper, and the roller will drop therefrom into the lower passageway of the outlet chute. To divert rollers of incorrect taper to the upper or outer passageway 74, a supplementary or rejector chute 75 is provided. This rejector chute is operated by mechanism to be hereinafter described and controlled by the gauging mechanism. When a roller of incorrect taper is gaged the rejector chute 75 is moved into position to receive the roller from the roller receiving block and direct it to the upper passageway 74 of the outlet chute.

The rejector chute is formed in a member 76 that has beveled edges that are mounted in a cooperating undercut recess provided therefor in the end of a lever 77. One side wall of the undercut recess is formed by a detachable cap 78 that is secured to the end of the lever by a screw 79. Thus the chute member 76 can be adjusted or removed. The lever 77 is mounted on a pin 80 that is secured to a lug 81 that is in alinement with the lug 27 in which is mounted the pin 30 that supports the feed lever 29.

Secured to the frame of the machine and to the lever 77 is a spring 82 that is always under tension so that it tends to swing the rejector chute 75 into a position in alinement with the gauging block 38. The lower end of the lever 77 is provided with a pin 83 that moves on the rejector cam 18. This cam 18 swings the lever 77 so that the rejector chute is moved away from the gauging block after each time that it has been moved into alinement therewith to receive a roller.

Normally the lever 77 is held by means of a latch member 84 on the end of a lever 85 that is pivoted to the back of the frame, so that the lever 77 cannot be moved by the spring 82, after it has been released by the cam. When a roller of incorrect taper is gaged this latch member 84 is moved clear of the end of the lever 77 so that the rejector chute 75 may be swung into alinement with the gauging block 38.

A spring 86 is secured to the latch lever 85 and to the frame of the machine, and tends to keep the latch 84 in engagement with the end of the rejector lever 77. Secured to the frame of the machine is an electro-magnet 87 that operates the rejector mechanism. The armature 88 of this magnet projects therefrom to a point adjacent to the upper end of the latch lever 77. When the rejector magnet is energized by the closing of the circuit therethrough (which will be hereinafter described, see Fig. 9 for wiring diagram) the upper end of the latch lever 85 is attracted by the armature 88 of the magnet 87 and the lower end is swung clear of the end of the rejector lever 77. When the magnet circuit is broken, the spring 86 pulls the latch lever 85 so that when the rejector lever 77 is again moved by the rejector cam 18 the latch lever 85 will engage it and hold it in position.

Vertically mounted in the roller stop block near one end thereof is a screw 89. The screw 89 can, of course, be adjusted vertically and the block and screw can be adjusted horizontally as hereinbefore described. The screw 70 secures the stop block in position and also secures the vertical screw 89 in position.

Pivotally mounted in the indicator housing 4 on a pin 91 is a lever 92 whose end projects from the indicator housing above the gauging block 38. Mounted in the end of said contact lever 92 is a screw 93 that contacts with the rollers 26 being gaged. The contact screw 93 is provided with a set screw 94 for holding it in position. Secured to a member 95 projecting from the indicator housing directly above the contact screw 93 is a vertically adjustable screw 96 that serves to limit the upward movement of the contact screw 93 and lever 92. The stop screw 96 is provided with a set screw 97 for holding it in any desired position.

In order to set the gauging mechanism, a roller of exactly normal or standard taper is placed in the gauging block 38 and the block is moved so that the roller engages the contact screw 93. Then the contact screw 93 is adjusted until the pointer of the indicating mechanism points to zero on the scale.

Secured to the indicator housing 4 between the stop screw 96 and the contact screw 93 and contacting with a roller on the gauging block at about its middle is a spring 98. Said spring 98 holds the roller in position in the roller receiving recess in the gauging block while it is being gaged.

Pivotally mounted in the indicator housing, as by a pin 99, is a lever 100 at whose upper end is mounted a gear segment 101. The end of the contact lever 92 rests on a projecting portion of the lever 100 that carries the gear segment 101. The gear segment 101 meshes with a pinion 102 that is pivotally mounted in the indicator housing as by a pin 103. The pin 103 is provided with a projecting arm 104 on the end of which is a gear segment 105 that meshes with a pinion 106 on a shaft 107 that is pivotally mounted in the indicator housing and to which is secured a pointer 108 that is movable in an arcuate slot 109 in the indicator housing along which is mounted a graduated scale 110 for indicating the taper of the roller being gaged. The pins 91, 99 and 103 and the shaft 107 are all provided with suitable bearings 111 and the pinion 106 is provided with a pin 112 that projects from the rear of the indicating housing. This pin counterbalances the weight of the pointer and also permits the pointer shaft 107 to be held while parts of the indicating and gauging mechanism are being adjusted.

Adjustably secured to the pointer shaft 107 on either side of the pinion 106 are downwardly extending trip levers 113. The lower ends 114 of these levers 113 are arcuate, the radius of curvature being equal to the distance from the center of the pointer shaft 107 to the ends of the levers. The levers are inclined somewhat from the vertical, the levers being inclined in opposite directions from each other. Pivotally secured to a hinged supporting member or carrier 115 are levers 116 one being directly beneath each of the above mentioned trip levers 113, and each having a slight projection 117 at the end, said projections having straight or vertical edges. The supporting member 115 is hingedly secured to a suitable projection 118 on a rearwardly extending portion of the base of the indicator housing 4.

A vertically disposed rod 119 extends through a guide 120 that is secured to the frame. A collar 121 is mounted on said rod 119 above the guide 120, and serves to limit the downward movement of said rod. The lower end of the rod is provided with a cap member 122 that is pivotally connected to a bent lever 123 that is mounted on a suitable pivot pin 124 that is secured to the frame of the machine. The lower end of the bent lever has a portion that is adapted to be engaged by a projection 125 on a rejector cam 18 at one point of its revolution. This contact swings the bent lever 123 and raises the rod 119 and the rod, in turn, raises the lever support 115. This movement takes place when a roller is being gaged. If the roller is of the correct degree of taper each lever 116 swings clear of the corresponding trip lever 113 on the pointer shaft said levers being in the position shown in Fig. 6. If the roller is off taper far enough, one of the trip levers 113 on the pointer shaft 107 will be swung far enough to contact with the projecting end portion of one of the levers 116 on the carrier 115 and further upward movement of the end of said lever will then be prevented, and the lever will be forced to swing on its pivot, thus moving its other end away from the carrier.

Secured to each of the levers 116 and insulated therefrom is an electrical conductor 126 that has a suitable contact point 127, as of platinum, that contacts with a similar contact point 128 on a conducting member 129 that is secured to and insulated from the lever carrier 115. The contact members 129 of the lever carrier 115 are electrically connected with a source of electric current and the contact members of the levers are connected with the poles of an electro-magnet 130 that is secured to the frame of the machine. This auxiliary magnet controls the circuit that energizes the rejector magnet 87 above described. The projecting armature 131 of the auxiliary magnet extends to a point adjacent to the upper end of a lever 132 that is pivotally secured to a suitable support 133 on the frame of the machine. Projecting downwardly from said support 133 in alinement with the lever 132 is an arm 134. A spring 135 secured to the arm and to the lever 132 tend to keep the lower ends thereof close together. Secured to said lower ends are contact members 136 of which one is electrically connected with one line 137 of an electric circuit (which may be the same circuit that controls the auxiliary magnet 130) and the other is connected with one terminal of the rejector magnet 87 the other terminal of said rejector magnet 87 being connected with the other line 138 of said circuit.

Normally the electric circuit is closed through the auxiliary magnet 130, the contact points on the levers 116 and lever carrier 115 being in contact with each other. Thus the auxiliary magnet 130 is energized and the upper end of the lever 132 is held in contact with the armature 131 against the pull of the spring 135. Thus the circuit through the rejector magnet 87 is open, there being a break between the contact points 136 of the arm 134 and the lever 132.

The latch lever 85 is thus held engaged with the rejector lever 77 and the rejector chute 75 cannot be operated.

When a roller of incorrect taper is being gaged one or the other of the trip levers 113 on the pointer shaft (depending upon whether the taper is greater or less than a satisfactory taper) is moved so that it contacts with the corresponding lever 116 on the lever carrier 115. Thus the contact between the contact member 127 of said lever and the corresponding contact member 128 of the lever carrier 115 will be broken, and the auxiliary magnet 130 will be de-energized. The spring 135 will then pull the lever 132 and arm 134 towards each other causing the contact members 136 at the ends thereof to come together. Closing the circuit through the rejector magnet 87 will cause the latch lever 85 to be attracted and release the rejector lever 77 from its latch 84 and permit the rejector spring 82 to move the rejector chute 75 into alinement with the gauging block.

By changing the trip levers 113 on the pointer shaft 107 it is possible to vary the amount that a roll may be off taper without being rejected. Thus the rollers may be held very closely to an exact degree of taper or considerable variation may be permitted. Figs. 7 and 8 show the position of the trip levers 113 and levers 116 when a roller at the maximum limit above the exact taper desired and one at the minimum limit below the exact taper desired is being gaged. The straight faces of the trip lever 113 is in contact with that of the corresponding lever 116. If a roller of slightly greater taper or slightly less taper were gaged the lever 116 would be tripped and its upward travel prevented. The amount of upward travel is comparatively small, as is illustrated.

The operation of the machine is as follows: The rollers 26 are fed into the inlet chute 25 with their smaller ends forward or downward. The feed of the rollers into the inlet chute is regulated so as to correspond with the speed with which the rollers pass through the gauging machine. The lower or forward roller 26 rests in the recess of the block 22 that supports this inlet chute, the end of the roller abutting against the end of the feed finger 32. The feed finger is then rotated slightly and comes to a stop with its recess 36 in alinement with the recess in the block 22 at the end of the inlet chute and the weight of the rollers in the chute presses a roller into the feed finger 32, the roller being prevented from being pushed out of said finger by abutting against the side of the gauging block 38. The finger is then swung until it is in alinement with the pockets 37 in the gauging block 38. The feed pin 51 is then operated by the shifter cam 15 and the roller is pushed into the pocket 37 in the gauging block 38. In the meantime the support for the said member closes the end of the inlet chute, preventing rollers from escaping therefrom.

The feed pin 51 at once moves back and the feed finger 32 moves into position to be ready to receive the next roller.

After the roller has been positioned in the gauging block 38, said block is raised by the mechanism above described until the end of the roller contacts with the screw 89 and further upward movement of the roller and block is prevented. The additional upward travel of the plunger 39 is taken up by the spring 50 therein. The upward pressure of said spring 50 and the downward pressure of the roller engaging spring 98 secured to the indicating housing holds the roller firmly in position.

The roller is then gaged, as above described, the indicator showing the operator whether or not the roller is of the proper taper and also indicating the exact degree of taper. After the roller has been gaged, the gauging block 38 is lowered by the action of the elevating cam 17 and is brought into alinement again with the feed finger 32 which has been moved into position to feed the next roller. The feed pin 51 then moves the following roller 26 into the gauging block 38 and forces out of said block the roller that has just been gaged. If the roller is of the proper taper it will drop from the receiving block into the lower passageway 73 of the outlet chute. If it is not of the proper degree of taper the rejector chute 75 will have been moved into position and will carry the roller to the upper passageway 74.

By watching the indicating device and the rejecting device the operator of the machine can see whether the rollers are being assorted properly by the machine. The machine is easily adjustable to permit any desired variation of rollers from the normal degree of taper. The machine may be easily adjusted for rollers of various sizes. The operation of the machine is automatic, it is comparatively simple and quite easy to operate, and is not likely to get out of repair.

Obviously numerous changes may be made without departing from my invention and I do not wish to be limited to the precise construction shown.

What I claim is:

1. In a machine of the kind described, a taper gauging and indicating mechanism in combination with means for assorting the rollers according to their taper, said assorting means being operatively connected with said gauging means to be actuated thereby.

2. In combination with a machine for gauging and assorting articles according to taper, means operatively connected with the gauging device for indicating the degree of taper of the article being gaged.

3. In a taper gauging machine, the combination of means for indicating the degree of taper of the article being gaged, with means for assorting the articles according to their taper, said indicating means and said assorting means being operatively connected with the gauging mechanism.

4. In a taper gauging machine, the combination of means for indicating the degree of taper of the article being gaged, with means for assorting the articles according to their taper, articles within predetermined limits being separated from articles above and below said limits.

5. In a taper gauging machine, the combination of means for indicating the degree of taper of the article being gaged, with means for assorting the articles according to their taper, articles within predetermined limits being separated from articles above and below said limits, and means for changing said limits.

6. A taper gauging and assorting machine for rollers for roller bearings and the like comprising an inlet chute for the rollers, a swinging feed finger adapted to receive a roller from said inlet chute, a gauging block adapted to hold a roller while it is being gaged, a feed pin adapted to force a roller from said feed finger into said block, means for raising said block, gauging and indicating mechanism adapted to be operated by a roller in said block, an outlet chute having one passageway intended for rollers of suitable taper and another passageway for rollers of too great and too small taper and means controlled by said gauging mechanism for delivering rollers into the proper passageway of said outlet chute.

7. A taper gauging and assorting machine for rollers for roller bearings and the like comprising an inlet chute for the rollers, a swinging feed finger adapted to receive a roller from said inlet chute, a gauging block adapted to hold a roller while it is being gauged, a feed pin adapted to force a roller from said feed finger into said block, means for raising said block, said means including a resilient connection whereby movement of the operating means is permitted after movement of said block has been stopped by the roller therein coming in contact with the gauging mechanism, gauging mechanism adapted to be operated by a roller in said block, an outlet chute having one passageway intended for rollers of suitable taper and another passageway for rollers of too great and too small taper and means controlled by said gauging mechanism for delivering rollers into the proper passageway of said outlet chute.

8. A taper gauging and assorting machine for rollers for roller bearings and the like comprising an inlet chute for the rollers, a swinging feed finger adapted to receive a roller from said inlet chute, a gauging block adapted to hold a roller while it is being gaged, a feed pin adapted to force a roller from said feed finger into said block, means for raising said block, said means including a resilient connection whereby movement of the operating means is permitted after movement of said block has been stopped by the roller therein coming in contact with the gauging mechanism, gauging mechanism adapted to be operated by a roller in said block, an outlet chute having one passageway intended for rollers of suitable taper and another passageway for rollers of too great and too small taper and means controlled by said gauging mechanism for delivering rollers into the proper passageway of said outlet chute, said means including a member adapted to be swung into position adjacent to the roller receiving block to receive a roller therefrom.

9. In a gauging and assorting machine, a gauging mechanism, means for feeding articles in position to be gaged, means controlled by said gauging mechanism for assorting said articles according to whether they are within predetermined limits or above the maximum or below the minimum limit, and means for changing said maximum and minimum limits, said means comprising a pair of levers arranged to control an electric circuit for operating the assorting means, and trip levers operatively connected with the gauging mechanism, one trip lever being adapted and arranged to trip one of said first mentioned levers when an article above the maximum limit is gaged and the other trip lever being adapted and arranged to trip the other of said levers when an article below the minimum limit is gaged, said trip levers being adjustably mounted.

10. A machine for gauging and assorting rollers for roller bearings and the like comprising an inlet chute, a gauging block provided with a recess adapted and arranged to hold a roller while it is being gaged, means for transferring a roller from said inlet chute to the recess in said block, gauging mechanism adapted and arranged to be operated by a roller in said block, an outlet member having a plurality of passageways for rollers of different characteristics and means controlled by said gauging mechanism for delivering a roller into the proper passageway.

11. A machine for gauging rollers for taper and assorting according to taper, comprising an inlet chute for the rollers, a gauging block provided with a recess adapted and arranged to hold a roller while it is being gaged, means for transferring a roller from said inlet chute to the recess in said block, taper gauging and indicating mechanism adapted and arranged to be operated by a roller in said block, a plurality of outlet passageways for rollers of different tapers, and means controlled by said gauging mechanism for delivering a roller from said block into the proper passageway.

12. In a gauging and assorting machine for rollers for roller bearings and the like, a block for holding a roller in position to be gaged, means for feeding a roller endwise into said block, thereby forcing from said block the roller that has been gaged, and a rejector device for separating unsatisfactory rollers from the others.

13. In a gauging and assorting machine for rollers for roller bearings and the like, a block for holding a roller in position to be gaged, means for feeding a roller into said block, thereby forcing from said block the roller that has been gaged, a rejector device for separating unsatisfactory rollers from the others, and means for operating said rejector device, including a normally open electric circuit, and a normally closed circuit being broken when an unsatisfactory roller is gaged, the breaking of said circuit closing said normally open circuit to move said rejector device into position to receive a roller from said block.

14. In a gauging machine, gauging mechanism, a gauging block adapted to hold an article in position to be gaged and a rejector device adapted to receive unsatisfactory articles from said gauging block, said rejector device comprising a pivotally mounted member having a recess in the upper surface thereof, means for normally holding the rejector member clear of the gauging block and means for swinging the rejector member into alinement with the gauging block when a defective article is gaged 15. In a gauging machine, gauging mechanism, a gauging block adapted to hold an article in position to be gaged and a rejector device adapted to receive unsatisfactory articles from said gauging block, said rejector device comprising a pivotally mounted member having a recess in the upper surface thereof, means for normally holding the rejector member clear of the gauging block, means for swinging the rejector member into alinement with the gauging block when a defective article is gaged, and means for swinging the rejector device clear of the gauging block after it has received a defective article.

16. In a gauging machine, gauging mechanism, a hollow plunger beneath said gauging mechanism, a gauging block mounted on said hollow plunger and adapted to hold an article to be gaged and means for raising and lowering said hollow plunger, said means comprising a lever having a portion projecting into said plunger and resting on a ball in the bottom of said plunger, a second ball resting on said lever and a spring extending from said ball to the top of the plunger.

17. A gauging and assorting machine comprising gauging mechanism, an inlet chute, a feed finger adapted and arranged to receive a roller from said inlet chute, a gauging block, a feed pin adapted and arranged to force the roller from said feed finger into said gauging block, means for raising said gauging block to place the roller therein in position to be gaged, and means controlled by the gauging mechanism for delivering the roller to one of a plurality of outlets.

18. A gauging and assorting machine comprising gauging mechanism, an inlet chute, a feed finger adapted and arranged to receive a roller from said inlet chute, a gauging block, means for swinging said finger into alinement with said gauging pin, a feed pin adapted and arranged to force the roller from the feed finger into the gauging block, thereby forcing from the gauging block the roller that has been gaged, means for raising said gauging block to bring the roller therein in contact with the gauging mechanism, means for lowering said gauging block after the roller has been gaged, an outlet for satisfactory rollers, an outlet for unsatisfactory rollers and normally inoperative rejector mechanism controlled by said gauging mechanism and adapted to be moved into position to divert an unsatisfactory roller into the chute therefor.

19. A gauging and assorting machine comprising gauging mechanism, an inlet chute, a feed finger adapted and arranged to receive a roller from said inlet chute, a gauging block, means for swinging said finger into alinement with said gauging pin, a feed pin adapted and arranged to force the roller from the feed finger into the gauging block, thereby forcing from the gauging block the roller that has been gaged, means for raising said gauging block to bring the roller therein in contact with the gauging mechanism, said means including a resilient member, means for lowering said gauging block after the roller has been gaged, an outlet for satisfactory rollers, an outlet for unsatisfactory rollers, normally inoperative rejector mechanism controlled by said gauging mechanism and adapted to be moved into position to divert an unsatisfactory roller into the chute therefor, a rotary shaft and cams thereon for operating said feed fingers, gauging block, feed pin and rejector mechanism.

20. A gauging and assorting machine comprising gauging mechanism, a gauging block for holding an article being gaged, pivotally mounted trip levers controlled by said gauging mechanism, a carrier, levers mounted thereon beneath said trip levers, a rejector device, said levers constituting switch members for an electric circuit for controlling said rejector device, and means for raising said carrier when an article is gaged, whereby one of said trip levers engages the corresponding lever if the article being gaged is defective.

Signed at Canton, Ohio, this 28th day of June, 1923.

OSWALD SCHLAUPITZ.